R. P. PESUSICH.
AUTO BRAKE.
APPLICATION FILED JUNE 18, 1921.
1,428,802.
Patented Sept. 12, 1922.
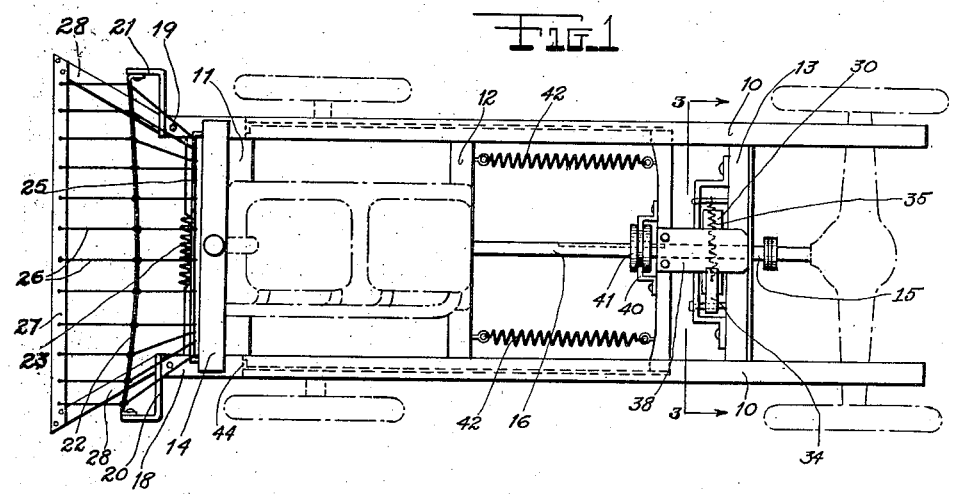
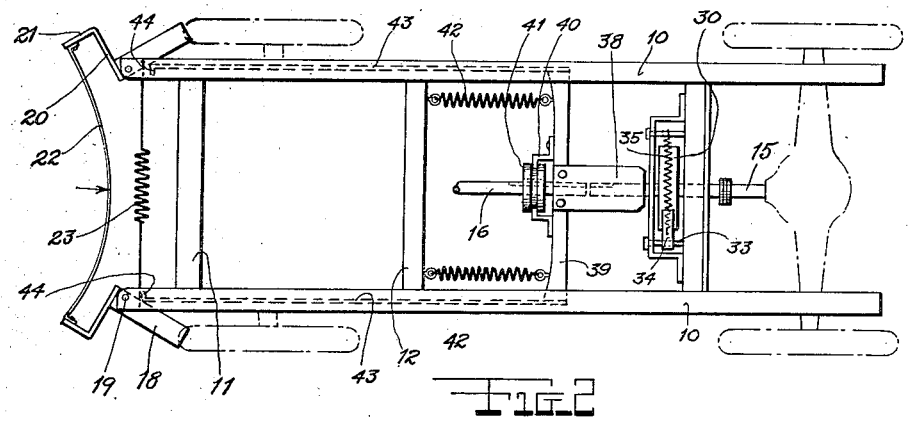
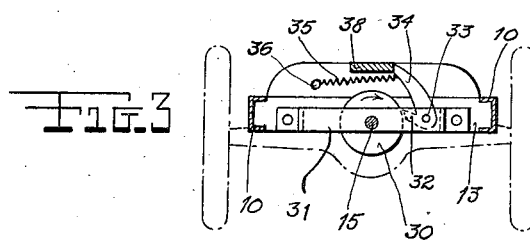
INVENTOR
Roko P. Pesusich
BY
his ATTORNEY Patented Sept. 12, 1922.

1,428,802

UNITED STATES PATENT OFFICE.

ROKO P. PESUSICH, OF NEW YORK, N. Y.

AUTO BRAKE.

Application filed June 18, 1921. Serial No. 478,499.

*To all whom it may concern:*

Be it known that I, ROKO P. PESUSICH, a citizen of Italy, residing at New York, in the county of New York and State of New York, have invented certain new and useful Improvements in Auto Brakes, of which the following is a specification.

The main object of this invention is to provide a safety bumper for vehicles, particularly automobiles, and combine with it a brake device actuated consequent upon contact with the bumper.

A further object is in the provision of means for the above purpose which are so arranged as to occupy no valuable space in the vehicle, the parts being arranged in and between the chassis frame below the body.

These and other like objects are attained by the novel construction, combination and arrangement of parts hereinafter described and shown in the accompanying drawings, forming an essential part of this disclosure, and in which:—

Figure 1 is a plan view of an automobile chassis showing the assembly of parts comprising the invention in normal position ready for operation.

Figure 2 is a similar view of the same, parts of the bumper being omitted and the brake device shown in operative position.

Figure 3 is a transverse sectional view taken on line 3—3 of Figure 1.

Referring in detail to the drawings, the numeral 10 designates the side frame members of a conventional type of chassis the same being usually of channel section, connected near their front ends by cross bars 11 and 12, a similar bar 13 being further to the rear.

A radiator 14 is arranged as usual at the front and a transmission shaft 15 extends longitudinally, midway between the frame members from the motor shaft 16, to the transmission gears upon the rear axle as usual.

Bell-crank levers, having rearwardly extending elements 18, are pivoted on pins 19 set in the front ends of the frame members 10, and extending outwardly at a right angle are the other elements 20 of the bell-cranks, terminating in projections 21 parallel with the elements 18.

Fixed to the inner sides of the projections are the ends of a flexible strap 22 extending completely across the front of the vehicle and including the entire space within the outlines of its front wheels.

This strap is maintained in a stressed condition by a tension spring 23, the ends of which are engaged with the bell-crank elements 18 at points rearward of the pivots.

A rod 25, carried by the vehicle frame in advance of the radiator 14, has attached to it at spaced intervals a plurality of flexible strands 26, connected to the strap 22 and thence continued to a rail 27 disposed horizontally at a height sufficient to clear the surface and supported by angular braces 28 attached to the chassis.

This construction provides a basket-like device, receptive of a person or thing obstructing the vehicle without material damage being done. This basket, as shown in Figure 1, is not a consequential part of the invention, however the strap element 22 is important it being used to operate the brake device as will now be described.

Rigidly secured to the transmission shaft 15, adjacent the bar 13, is a flat faced brake disc 30, at the front of which is bracket 31 fixed to the bar at its offset ends.

A lever, having a short arm 32 adapted to engage the brake disc, is pivoted on a pin 33 extending through the bracket into the bar 13, another arm 34 extending upward and inward partially over the disc, this arm being drawn by a tension spring 35, fixed on a pin 36, in such manner as to cause the arm 32 to make operative contact with the brake disc.

Such contact is however prevented under normal conditions due to the interposition of a plate 38 riveted or otherwise rigidly secured to a bar 39 and against which the long arm 34 of the lever rests.

Carried by the bar 39 are a pair of opposed, substantially Z shaped elements 40, their adjacent, offset ends engaging in the annular groove of a clutch member 41 operatively engaged with the engine shaft 16 and capable of connecting or disconnecting it relative to the transmission shaft 15.

This bar is slidable longitudinally of the frame elements 10 in the channels thereof and is drawn normally toward the front by a pair of tension springs 42, its ends being engaged in eyes attached respectively to the bar 39 and fixed across bar 12 of the frame.

Fixed to the ends of the bar 39, are rods 43 extending within the channels of the frame members 10, to the front and provided with inturned ends 44 adapted to abut against the bell-crank lever elements 18, which maintain the parts of the brake structure extended as shown in Figure 1.

Upon contact with an object sufficient to stress the flexible strap 22 and bend it inwardly, it will be obvious that its ends will be drawn towards each other, causing the bell-crank levers to move upon their pivots and their elements 18 to be turned outwardly, freeing the ends of the rods 43, allowing the bar 39 to be drawn forward by the springs 42 and consequently applying the brake lever arm 32, co-incidently disconnecting power from the motor, thus bringing the vehicle to a sudden stop.

Although the foregoing is descriptive of the preferred embodiment of the invention, it will be apparent that minor changes may be made in its construction, without the exercise of invention or conflicting with the scope of the claims hereto appended.

Having thus described my invention, what I claim as new and desire to secure by Letters Patent, is:—

1. In an automobile having a chassis frame and a motor driven shaft transmitting movement to the rear wheels, a pair of opposed bell-cranks pivoted on said frame at the front thereof, a flexible bumper strap connecting between said bell-crank at their front extending members, a spring connecting between their rear members, a brake disc on said shaft, a spring actuated brake lever engageable therewith, a spring retracted sliding detent plate adapted to hold said lever out of engagement, and means slidable in said chassis frame operatively engaged by said bell-cranks for releasing said detent consequent to flexing said strap.

2. In an automobile having opposed channelled chassis frame elements, cross bars rigid therebetween, a motor driven transmission shaft comprising a rear and forward section and a clutch for connecting said sections, a brake disc fixed on said rear section, a pivoted, spring impelled lever having one arm engageable with said disc, a slide intercepting the other arm of said lever whereby the first named arm is held out of engagement, a bar slidably mounted at its ends in the channelled frames, said bar being engaged with said slide, means for normally drawing said bar towards the front, rods in said frame elements engaged with the ends of said bar, bell-crank levers pivoted on the front ends of said frame members against which said rods abut, and a flexible bumper strap operatively engaged with said bell-cranks whereby they are released from said rods upon flexing the strap.

In witness whereof I affix my signature.

ROKO P. PESUSICH.